United States Patent [19]

Prymak

[11] Patent Number: 4,509,103
[45] Date of Patent: Apr. 2, 1985

[54] LOW DISSIPATION FACTOR MONOLITHIC CAPACITOR FOR HIGH FREQUENCY APPLICATIONS

[75] Inventor: John D. Prymak, Allegany, N.Y.

[73] Assignee: AVX Corporation, Great Neck, N.Y.

[21] Appl. No.: 575,926

[22] Filed: Feb. 1, 1984

[51] Int. Cl.$^3$ ............................................. H01G 1/13
[52] U.S. Cl. ................................................... 361/321
[58] Field of Search ................ 361/307, 309, 320, 321

[56] References Cited

U.S. PATENT DOCUMENTS

| | | | |
|---|---|---|---|
| 3,184,661 | 5/1965 | Weller et al. | 361/307 |
| 3,379,943 | 4/1968 | Breedlove | 361/307 X |
| 3,612,963 | 10/1971 | Piper et al. | 361/309 X |
| 3,745,431 | 7/1973 | Imamura et al. | 361/321 |
| 4,101,952 | 7/1978 | Burn | 361/320 X |

*Primary Examiner*—Donald Griffin
*Attorney, Agent, or Firm*—Arthur B. Colvin

[57] ABSTRACT

The present invention relates to improvements in ceramic monolithic capacitors and is directed more specifically to a low value, low loss capacitor especially adapted for use in high frequency applications. The capacitor is characterized in that the same includes two electrode layers, namely a surface electrode mounted on an end portion of the monolith and an internal electrode which extends across the entire cross section of the monolith in spaced parallel relation to the surface electrode. Termination is effected to the internal electrode about the entire periphery of the monolith, and to the surface electrode preferably over substantially the entire area of the surface electrode.

7 Claims, 6 Drawing Figures

LOW DISSIPATION FACTOR MONOLITHIC CAPACITOR FOR HIGH FREQUENCY APPLICATIONS

BACKGROUND OF THE INVENTION

1. Field of the Invention

The present invention relates to monolithic ceramic capacitors and is directed more particularly to low value monolithic capacitors, particularly adapted for use in high frequency circuits i.e. circuits operating in frequencies of from a megahertz and beyond.

The invention is further directed to capacitors of the type described having relatively low values in the range of up to about 25 to 30 pico farads.

2. The Prior Art

Conventional ceramic capacitors of the monolithic type are typically comprised of two or more electrode layers encapsulated within a monolith of fired ceramic dielectric material. Typical monolithic ceramic capacitors and methods of making the same are illustrated in the following U.S. Pat. Nos. Re. 26,421 reissued July 2, 1968 and 3,456,313 issued July 22, 1969.

In capacitors of the type described, it is conventional to fabricate the electrode layers in such manner that a layer or layers of the same polarity include marginal edges exposed at one side of the monolith. An electrode layer or layers of opposite polarity include margin portions exposed at an opposite side of the monolith. The edges of the electrodes remote from the exposed margins terminate short of the opposite surface of the monolith with the result that electrodes of opposite polarity overlap for a major portion of their surface areas. Capacitors of the type described are terminated by applying a conductive coating over each of the edges of the monolith at which the margins of the electrodes are exposed.

Multilayer capacitors of the type described hereinabove are highly efficient and compact, providing substantial capacitance in a small package. Where low capacitance values are required resort has been had to monolithic capacitors having only two electrode layers within the ceramic matrix, the layers being separated by a dielectric layer. The use of a single electrode of each polarity is necessitated by the fact that if multiple layers were employed the dimensions of the capacitor would be so small as to render the manufacture and subsequent handling of the capacitor impracticable.

While two electrode monolithic ceramic capacitors of the type described are effectively used in many applications, attempts to employ such capacitors in high frequency circuitry have demonstrated that the dissipation factor (DF) of such capacitors, their low efficiency and their high equivalent series resistance (ESR) have militated against the use of monolithic ceramic capacitors in low value, high frequency applications.

SUMMARY OF THE INVENTION

The present invention may be summarized as directed to a novel ceramic monolithic capacitor especially adapted to be used in low capacitance-high frequency applications. The invention is further directed to a capacitor of the type described having an extremely low dissipation factor (DF) and low ESR.

In accordance with the invention a capacitor is provided of a monolithic ceramic geometric figure such as, by way of example, a right parallelepiped or a cylinder. The capacitor includes a buried electrode layer which extends perpendicular to the axis of the geometric monolith, the buried electrode extending about its entire perimeter to the periphery of the monolith, such that the margins of the electrode are exposed at the perimeter.

A second electrode is deposited on an external end surface of the monolith in parallel spaced relation to the buried electrode. The external electrode extends either to the perimeter of the monolith or to a point spaced just slightly inwardly from the perimeter. Terminations are effected to the capacitor thus formed by applying a conductive cap over the end of the monolith remote from the external electrode, the cap extending to a level which overlaps the perimeter of the buried electrode but terminates short of the external electrode. Portions of the cap overlying the side walls of the monolith are in electrical contact with the buried electrode throughout the entirety of the outer margin of the buried electrode.

Termination is effected to the external electrode at a central point, the termination to the external electrode perferably covering substantially the entirety of the external electrode. The resultant capacitor may be encapsulated or not as desired in accordance with the intended end application thereof.

A capacitor in accordance with the invention exhibits very low loss characteristics, exhibits low ESR and DF these characteristic being superior to conventional monolithic capacitors by an order of magnitude or more.

It is accordingly an object of the present invention to provide a monolithic capacitor especially adapted for use in high frequency applications, the capacitor exhibiting low loss characteristics.

A further object of the invention is the provision of a capacitor of the type described which exhibits low ESR, and low DF and which exhibits a tendency to resonate at higher frequencies.

GENERAL DISCUSSION OF PRIOR ART DRAWBACKS

In advance of description of the illustrated embodiments of the invention, it is helpful to an understanding of the advance of present invention to review the factors which I have discovered result in the poor performance of known monolithic ceramic capacitors when the same are operated at high frequencies.

Conventional monolithic ceramic capacitors are manufactured by first forming extended webs or sheets of green, unfired ceramic particles held together by an organic binder. The sheets are thereafter imprinted as by a screen printing operation with an ink comprised of suspended particles of noble metals resistant to oxidation and vaporization at the elevated temperatures to which the ceramic is subjected in a sintering operation. Two or more layers of green ceramic are screen printed with a multiplicity of electrode patterns are thereafter stacked one atop the other in such manner that the imprinted areas of each sheet are in partial registry with the imprinted areas of each adjacent sheet. In the resulting intermediate product the electrode forming printed areas include a first marginal edge which is out of registry with the electrode of the adjacent superposed layer, the opposite marginal edge of each electrode overlying a portion of the electrode of the adjacent sheet. Thereafter the stacked sheets are cut along cutting lines which intersect the projecting portions of the electrode layers of one polarity, the cutting lines not intersecting electrodes of the other polarity.

As a result there are formed individual capacitors having electrodes of one polarity exposed at a first marginal edge and electrodes of the opposite polarity exposed at the opposite marginal edge. The marginal edges of the electrodes opposite the exposed edges are buried within the body of the ceramic. The resultant capacitors are then heated to drive off the organic materials and thereafter heated at a higher temperature to sinter the ceramic.

The resultant capacitors are terminated by applying a separate conductive coating covering the exposed margins of the electrodes at the opposite edges of the capacitor.

Numerous drawbacks inhere in the resultant capacitor, when the same is used in high frequency applications. The cutting action above described results in a thinning of the electrode layer at the cut margin. Additionally, thinning of the pattern at its edges is inherent in the screen printing operation. It will thus be perceived that the termination is applied to a thinned area of the electrode with consequent relatively high electrical resistance at the interface of the electrode and termination. The high resistivity factor becomes more acute where the number of layers of electrode are small.

A further drawback of a capacitor of the type described resides in the fact that the density of the electrical field on the electrodes is highest at the edge of the electrode remote from the termination. This is so since there are no counter-veiling charges of similar polarity beyond such remote edge. As a result, the area of highest current density occurs at the very end of the resistive path defined by the body portion of the electrode.

A further drawback of monolithic capacitors of conventional construction for use in high frequency applications results in the relatively high inductance factor of such devices. This inductance factor results from the relatively long conductive path defined by the electrode and from the further fact that, as noted there is a field density imbalance at various areas of the capacitor.

A further drawback of conventionally formed monolithic ceramic capacitors of low values i.e. generally 30 pico farads or less, resides in the difficulty in obtaining accurate tolerances. This difficulty is engendered in part by the so-called "fringe effect" resulting from a separate and unpredictable capacitance being set up between the buried margin of one electrode and various points along the body portion of the opposite electrode.

DESCRIPTION OF ILLUSTRATED EMBODIMENTS

In order to attain the previously mentioned objects and such other objects as may appear herein or be hereinafter pointed out reference is made to the accompanying drawings in which.

Figure 1:
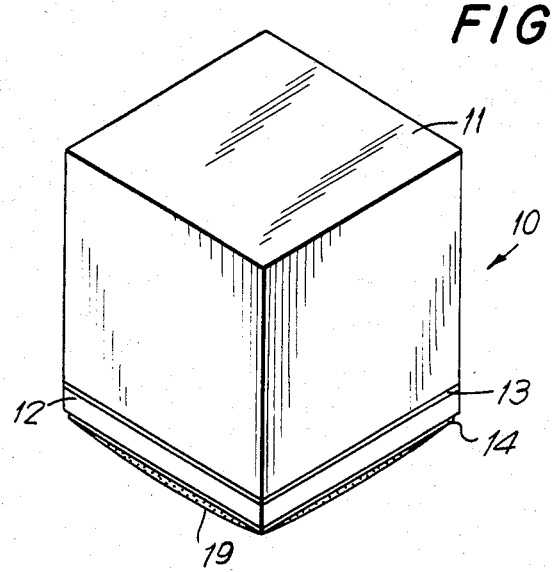
FIG. 1 is a perspective view of a capacitor in accordance with the invention prior to termination.
Figure 2:
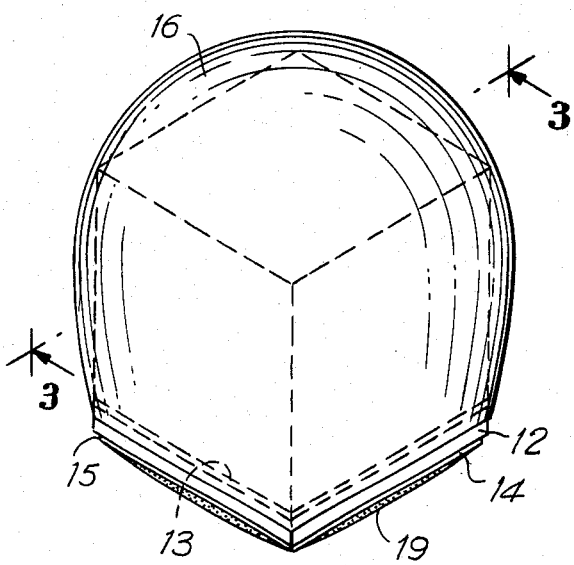
FIG. 2 is a perspective view of the capacitor of FIG. 1 after the same has been terminated.
Figure 3:
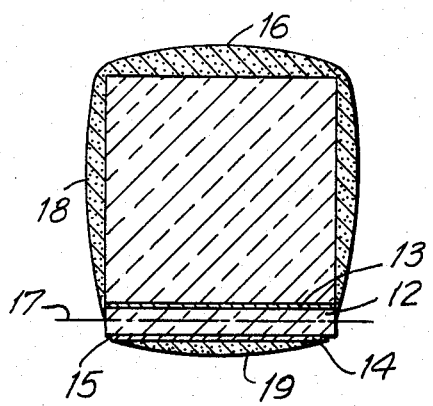
FIG. 3 is a section taken on the line 3—3 of FIG. 2.
Figure 4:
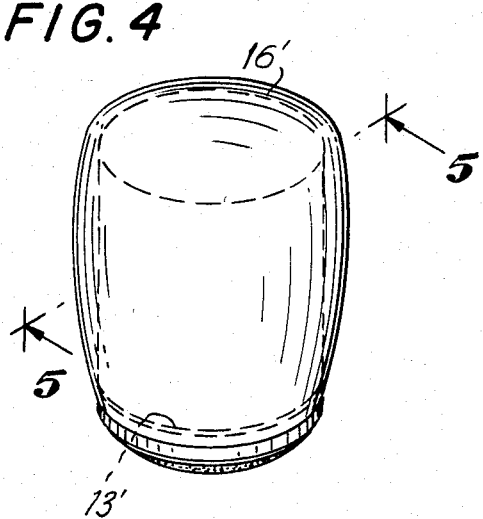
FIG. 4 is a perspective view of a finished cylindrical capacitor in accordance with the invention.
Figure 5:
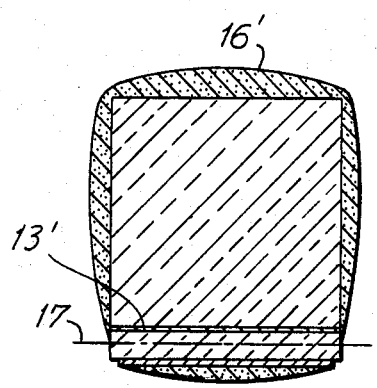
FIG. 5 is a section taken on the line 5—5 of FIG. 4.

Turning now to the drawings there is disclosed in FIG. 1 a monolithic capacitor 10 including ceramic components or layers 11 and 12 an interior or buried electrode 13 and a surface electrode 14. The capacitor 10 may be in the form of a parallepiped as shown in FIGS. 1 through 3 or in the configuration of a cylinder as shown in FIGS. 4 and 5.

The ceramic material may be any conventional ceramic, such as barium titanate, and the ceramic layers forming the capacitor may be fabricated by the conventional process of providing a slurry of green ceramic suspended in inorganic binder, extruding to provide a web, imprinting with electrode defining inks, stacking, heating to drive off organics, and finally sintering. Satisfactory procedures for effecting the various operations noted are known in the prior art as represented by way of example and without limitation in the following U.S. Pat. No. 3,456,313 of July 22, 1969 and U.S. Pat. No. Re. 26,421 reissued July 2, 1968.

As is well known, the capacitance derived is a function of the dielectric constant of the ceramic, the thickness of the dielectric layer 12, and the opposed electrode area. By way of example, a cube shaped 6 pf capacitor fabricated from ceramic of dielectric constant K60 and functional dielectric layer thickness of 0.020" has an overall size of 0.050" per side. A 15.5 pf capacitor, rectangular in cross section was formed using K60 ceramic overall size of 0.125"×0.125"×0.05" thickness. The thickness of the functional dielectric layer of the capacitor is 0.025". In each instance, the opposed electrode area corresponded to the cross sectional area of the entirety of the solid figure.

As will be apparent from the views, the buried electrode 13 extends to the side margins of the capacitor 10 throughout the entire perimeter thereof, i.e. all of the marginal portions of the electrode 13 are exposed. The external electrode 14 may extend to the marginal edges of the capacitor 10, but for ease of termination, as will be appreciated from the ensuing discussion, preferably extends to a position closely adjacent the side margins of the monolith to define a perimeteral ledge or rim portion 15 by which the electrode 14 is separated from the periphery of the monolith.

The capacitor is terminated by applying a covering layer or cap 16 of conductive material, the layer 16 perferably encompassing the entirety of the monolith down to a level represented by the line 17 which is disposed in the area below the level of the buried electrode 13, but above the level of the outer electrode 14. The purpose of slightly recessing the outer electrode 14 from the periphery of the monolith, is to reduce the chances that the side marginal portions 18 of the cap member 16, if projecting too far downwardly, might engage against and short to the outer electrode 14.

A termination 19 is effected to the outer electrode 14, the termination 19 preferably extending from the center of the electrode 14 over the major surface of the said electrode and into proximate relation to the side margins of the electrode 14.

The terminations may be effected in any conventional manner i.e. using a termination paste comprising a mixture of silver with a low melt glass frit compound. Other termination methods may be suitably employed. It is important to note, however, that the termination 16 should engage against the margins of the buried electrode 13 throughout the entire extent of these margins. That is to say, in a four sided monolith, contact is effected to the extent possible throughout the entirety of the four sides. In the case of the cylindrical capacitor illustrated in FIGS. 4 and 5, the termination 16' should engage against the entirety of the exposed circular area of electrode 13'.

The resultant capacitors may be used as shown or may be encapsulated in a polymeric or like material for protection against moisture. Similarly, connections coupling the capacitor to a circuit may be effected directly to the terminations 16 and 19 or such coupling may be effected to leads which are soldered to the terminations 16 and 19.

Figure 6:
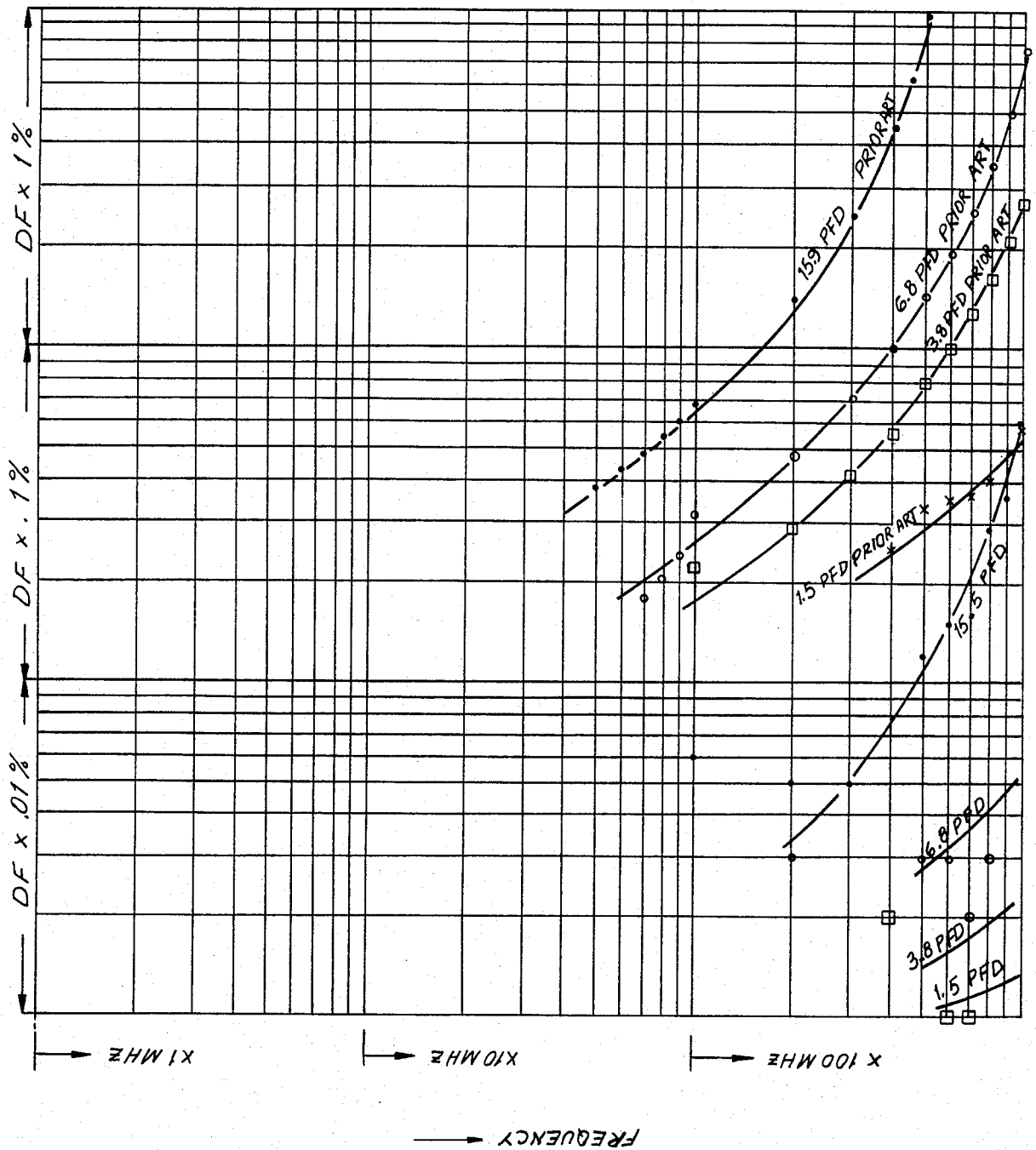
FIG. 6 is a graph comparing the dissipation factor at increasing frequencies of four (4) capacitors made in accordance with the instant invention with conventional capacitors of the same value.

FIG. 6 comprises a graphic representation comparing the dissipation factor of conventional monolithic capacitors with capacitors of equal value in accordance with the invention at progressively higher frequencies.

As will be apparent in all instances the dissipation factor increases with increasing frequencies. The dielectric composition employed for the capacitors was identical in all instances. Similarly, the dielectric thickness and overlap area of the electrodes was likewise as close to identical as manufacturing procedures would permit.

The below noted table extracted from the graphic information depicted in FIG. 6 clearly demonstrates that in all instances the efficiency of the capacitors in accordance with the invention is at least ten times greater than in conventional capacitors and in some instances the efficiency improvement is one hundred times greater.

| CAP. VALVE | FREQ. (Meg. Hz) | DF New Cap (%) | D.F. Prior Art Cap (%) |
| --- | --- | --- | --- |
| 1.5 pf | 600 | .002 | .34 |
| | 900 | .0055 | .5 |
| 3.8 pf | 500 | .008 | .08 |
| | 900 | .03 | 2.2 |
| 6.8 pf | 600 | .032 | 1.8 |
| | 900 | .046 | 5.0 |
| 15.5 pf new vs. | 200 | .034 | 1.6 |
| 15.9 pf prior art | 500 | .14 | 10.0 |

Without limitation as to any specific theory the efficiency increase of capacitors in accordance with the invention is considered to derive from the following factors:

a. Continuous bonding of the termination to the buried layer results in reduced resistance at the interface between the buried layer and termination.

b. Minimum resistive path of electrode present between the termination and area of buried electrode having highest charge density (the margin of buried electrode).

c. Current path is shortened in capacitor in accordance with the invention reducing inductance effects.

d. Charge density imbalances are minimized with resultant further reduction of inductance effects.

In addition to the advantages of increased efficiency, i.e. reduced ESR and DF, capacitors in accordance with the invention may be readily trimmed or reduced in value by the simple operation of removing material from edge portions of the monolith with resultant reduction of opposed electrode areas. Such trimming is not feasible with convention capacitors, since the only portions of the electrodes which are accessible at the edges of the monolith are the non-overlapping portions utilized to effect terminations.

From the foregoing it will be appreciated that there is described and illustrated in accordance with the invention a unique monlithic ceramic capacitor construction which is especially adapted for efficient operation in low value-high frequency applications.

It will be readily recognized that the configuration of the monolith may be varied from the specific configurations illustrated without departing from the principles of the invention. It will be further understood that devices in accordance with the invention may be fabricated of numerous different ceramic materials, and in various sizes, and configurations.

Accordingly the invention is to be broadly construed within the scope of the appended claims.

Having thus described the invention and illustrated its use, what is claimed as new and is desired to be secured by Letters Patent in the United States is:

1. A low loss, low value ceramic capacitor especially adapted for use in high frequency applications, comprising in combination a ceramic monolithic dielectric body portion in the form of a right geometric figure having a regular cross section portion taken in a direction normal to the longitudinal axis of said body portion, said body portion including a planar end surface, a first electrode formed on and covering essentially the entirety of said end surface, an internal electrode disposed within said monolith said internal electrode being in proximate spaced parallel relation to said first electrode and being separated from said first electrode by a layer of said ceramic, the side margin edges of said internal electrode extended to and being exposed at the edges of said body portion, a first termination portion comprising a conductive mass covering the center of said first electrode and in electrical contact therewith and a second termination portion comprising a conductive cap member covering substantially the entirety of the sides of said body portion from the end of said body portion remote from said end surface to a level overlapping said exposed edges of said internal layer, said second termination portion being in electrical contact with said side marginal edges of said internal electrode throughout substantially the entire extent thereof.

2. A capacitor in accordance with claim 1 wherein said first termination portion engages substantially the entirety of the area of said first electrode.

3. A capacitor in accordance with claim 2 wherein the end of said cap member nearest said planar end surface terminates at position along the side walls of said body portion beyond the level of said internal electrode, and spaced from said first electrode.

4. A capacitor in accordance with claim 3 wherein said cap member covers said end of said body portion remote from said end surface.

5. A capacitor in accordance with claim 3 wherein said body portion is cylindrical.

6. A capacitor in accordance with claim 3 wherein said body portion comprises a rectangular parallepiped.

7. A capacitor in accordance with claim 6 wherein said body portion is square in transverse section.

* * * * *